United States Patent [19]
Friedman

[11] 3,716,660
[45] Feb. 13, 1973

[54] APPARATUS TO IMPROVE RESOLUTION IN A SCANNED TRANSPARANCY SYSTEM

[75] Inventor: David Friedman, Framingham, Mass.

[73] Assignee: Singer-General Precision, Inc., Binghamton, N.Y.

[22] Filed: June 1, 1971

[21] Appl. No.: 148,838

[52] U.S. Cl.............................178/7.7, 315/27 GD
[51] Int. Cl..............................................H04n 3/16
[58] Field of Search..................178/6.5, 7.7, DIG. 28

[56] References Cited

UNITED STATES PATENTS 3,511,928  5/1970  Ratliff, Jr. ...............................178/6.5

Primary Examiner—Robert L. Richardson
Assistant Examiner—Donald E. Stout
Attorney—Francis L. Masselle, John C. Altmiller and William Grobman

[57] ABSTRACT

Apparatus to improve resolution and decrease distortion in system wherein a video signal is obtained by scanning a transparancy in a manner which requires increased scan speeds as the scanning spot moves away from the center is shown. A radial distortion lens having high axial demagnification decreasing toward the edges is placed between the scanner and transparancy and means are provided to correct the scan so that the combined output of the scanner and lens is the same as the scanner alone, the combined system resulting in a smaller spot size on axis and a decrease in required scanning speed toward the edges.

3 Claims, 3 Drawing Figures

PATENTED FEB 13 1973 3,716,660

INVENTOR.
David Friedman
BY
John C. Altmiller
AGENT

APPARATUS TO IMPROVE RESOLUTION IN A SCANNED TRANSPARANCY SYSTEM

This invention relates to visual and radar display systems for training purposes which utilize scanned transparencies, and more particularly to apparatus for improving resolution in such systems.

Visual and radar display systems which display an image generated by scanning, with a flying spot scanner, one or more transparencies, having recorded thereon information relating to the portion of the earth's surface to be displayed, have been found to be very useful in aircraft simulators. In the visual system two transparencies, one containing an orthophoto of a section of the earth's surface, and the other coded with elevation data for the same section are used. In the radar system the second transparency contains radar reflectance information. With modification the same principles may also be used for a collision avoidance radar training system. A detailed explanation of the type of visual system referred to is contained in U.S. Pat. No. 3,439,105 granted to W. C. Ebeling et al. on Apr. 15, 1969 and also in U.S. Pat. No. 3,060,596 granted to A. R. Tucker et al. on Oct. 30, 1962.

In such a system, the information is recorded as an orthophoto and must be scanned to produce a display as would be seen by an observer. As the observer views points further and further away, the speed at which the scan must move increases greatly until the horizon is reached. Theoretically the horizon is at infinity and spot speed likewise would have to reach that speed. But an artificial horizon limit is set to avoid that problem.

If the spot cannot move as fast as required, distortion will occur at the horizon area and the proper perspective will not be maintained. The present invention seeks to solve this problem by utilizing a radial distortion lens which will optically increase spot speed.

It is the principle object of this invention to provide a system for improving resolution and decreasing distortion in a scan transparency system.

It is also an object to provide such a system by using a radial distortion lens between the scanner and the transparency along with shaping circuits to correct the scan signals to take into effect the radial distortion.

Another object is to provide such a system which may be used wherever a scanner is required to scan radially with increasing speed toward the edges.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figure 1:
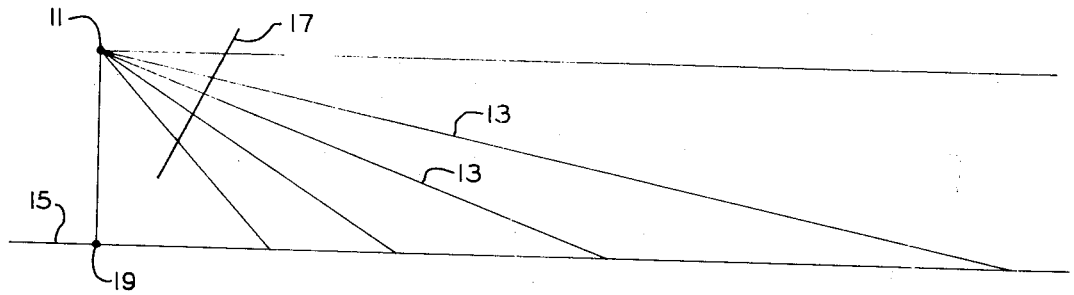
FIG. 1 is a diagram showing the relationship between points on a display and the same points projected on the ground.

In FIG. 1 the lines of sight 13 from an observation point 11 to various points in the ground plane 15 are shown. Point 11 can be the viewpoint of an observer and plane 17 the window through which he observes the ground plane 15. It can be seen that for lines 13 having equal angular or linear increments at the window plane 17 (as do the illustrated lines) the ground intersection points become progressively more distant in a non-linear fashion.

If plane 15 is assumed to be the transparency containing ground plane information and plane 17 a display on which that information will be displayed to an observer, it can be seen that a spot scanning plane 15 to pick up the required information, to be displayed linearly at plane 17, must move faster and faster as it goes away from the nadir point 19. The maximum spot speed will be limited by the flying spot scanner tube and electronics. As previously mentioned, distortion due to inability to achieve the required speed will often occur before reaching the desired horizon limit.

Figure 2:
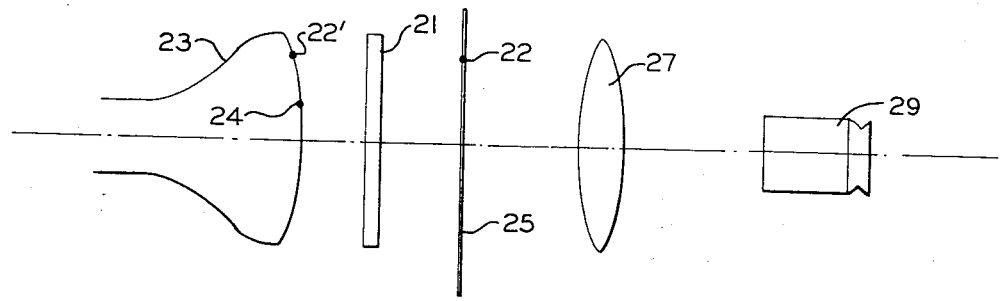
FIG. 2 is a schematic side view of the preferred embodiment of the optical portion of the invention.

FIG. 2 shows a radial distortion lens 21 placed between the flying spot scanner 23 and transparency 25. Optics 27 and photomultiplier 29 collect the information generated in a manner well known in the art. The distortion lens 21 will be of a type having high axial demagnification which decreases toward the edge. This results in the spot being smaller near the lens axis, thereby improving resolution, and in the effective spot speed being increased as the spot scans toward the horizon.

The system described in the above referenced patents computs the $X$ and $Y$ spot position according to the equations contained therein, based on the assumption that the spot will map linearly on the transparency. With the lens 21 interposed between the scanner tube and the transparency, means must be provided to produce the required output, not from the scanner alone, but from the combined scanner tube and lens 21. The radial position of the spot on the tube may be found from the equation $R^2 = X^2 + Y^2$, where $X + Y$ are the horizontal and vertical coordinate positions of the spot.

The radial distortion may be expressed by $R^2$ out = $R^2$ in times a function of $R$ ($f(R)$), where $R^2_{out}$ is the square of the radial position of the spot at the transparency indicated by point 22 on FIG. 2, $R^2_{in}$ is the square of the radial position on the scanner tube indicated by point 24 and $f(R)$ is the function of the distortion lens. As previously mentioned lens 21 will have high axial demagnification which decreases toward the edge. $f(R)$ will be the expression for the transfer function of the particular lens in use.

The $X$ and $Y$ output from the scan computer of the above referenced patents will be directly related to the desired position on the transparency. If these signals are provided to the scanner tube the result after passing through the radial distortion lens will be a spot at an improper position. Thus, the $X$ and $Y$ signals must be changed to $X'$ and $Y'$ signals, where $X'$ and $Y'$ are the required scanner tube coordinates to obtain a spot at $X$ and $Y$ on the transparency after radial distortion.

Figure 3:
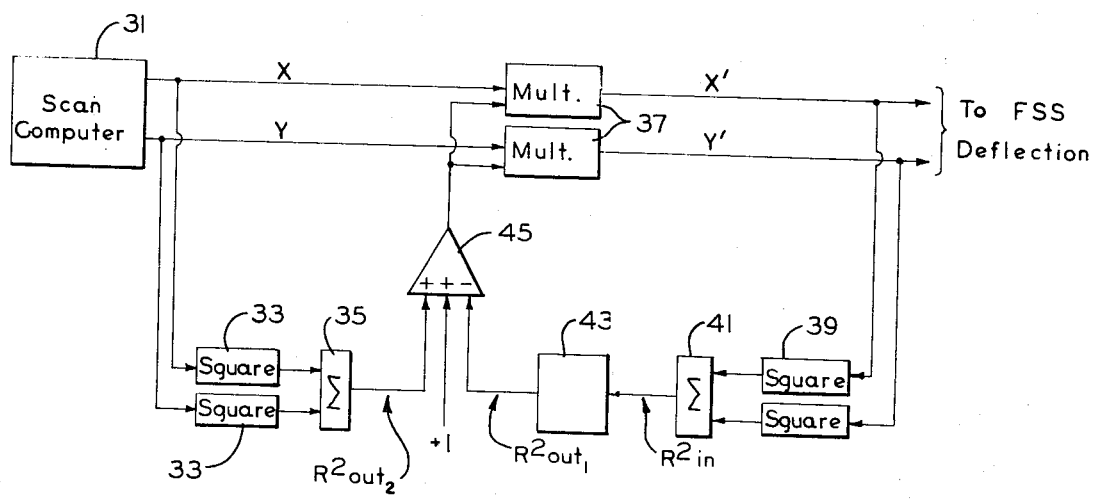
FIG. 3 is a block diagram of a preferred embodiment of the shaping circuits to correct for the radial distortion effects.

Such a shaping circuit to change the $X$ and $Y$ signals is shown in FIG. 3. Scan computer 31 is the computer in the above referenced patents and provides the $X$ and $Y$ position signals. The $X$ and $Y$ outputs are squared by conventional circuitry indicated by blocks 33 and then summed by summing means indicated by block 35. The $X$ and $Y$ signals are also supplied to multipliers 37 which have as outputs the actual deflection signals. These output signals are squared in blocks 39 and summed in block 41.

The outputs $X'$ and $Y'$ must be such that the final lens output would be as if $X$ and $Y$ were being imaged directly. Since $R$ is a linear function of $X$ and $Y$, multiplying $X$ and $Y$ by the same quantity will have the effect of multiplying $R$ by that quantity. In block 43 the $R^2_{in}$ is multiplied by $f(R)$ to obtain $R^2_{out_1}$. The $R^2_{out_1}$ output is summed in amplifier 45 with 1 and $R^2_{out_2}$. $R^2_{out_2}$ is the $R^2$ that comes from the $X$ and $Y$ outputs of computer 31 (corresponding to the $R$ of point 22 on FIG. 2) and also the $R^2$ which must appear on the transparency (point 22 on FIG. 2). $R^2_{in}$ is the $R^2$ necessary at the lens input to get $\overline{R^2}_{out_2}$ at the transparency. (corresponding to the $R$ of point 24 on FIG. 2)

Thus, when the $R^2_{in}$ from block is multiplied by $f(R)$ it becomes $R^2_{in}R^2/R^2$in out$_2$ or $R^2$out$_2$. When it is summed with $\overline{R^2}_{out_1}$ and 1 in amplifier 45, if the $R^2_{out_2}$ from block 43 is not equal to the $R^2_{out_1}$, from block 35, an error signal will result which will be provided to multipliers 37 to bring the $X'$ and $Y'$ signals to values which will cause the $R^2_{out}$ values to be equal. By using a common signal from amplifier 45 to process both $X$ and $Y$ any open loop multiplication errors are cancelled out by the feedback loop.

The blocks 35, 41 and 45 may be high frequency operational amplifiers of the type well known in the art. Multipliers 37 and squares 33 and 39 may be high frequency multipliers, suitable commercial embodiments of which are made by Analog Devices of Norwood, Mass. The block 43 which multiplies $R^2_{in}$ by $f(R)$ may be constructed using well known analog computing techniques such as those discussed in *Electronic Analog and Hybrid Computers* by Korn and Korn (McGraw Hill Book Company, 1954).

The function $f(R)$ will be found from lens design data or measurement of the lens using well known ray trace methods to provide the needed information for constructing block 43.

Thus, a system utilizing a radial distortion lens and appropriate scan control circuits which may be used to compensate for the distortions introduced in a scanned transparency system to improve resolutions and reduce distortion has been shown.

Although a flying spot scanner and transparency have been described above, the invention may also be used in other configurations where a scanning device scanning radially must increase scanning speed toward the edges. For example, a television camera might be arranged to scan a conventional photograph using the same basic principles described above.

What is claimed is:

1. In a system wherein video information is developed by radially scanning with a scanning device an image source in accordance with two scan signals, developed by a scan computer, which cause deflection from the center of the device along two mutually perpendicular axes and wherein the scan rate is required to increase as the scan position moves away from the center, apparatus to improve resolution and decrease the scan speed required comprising:
   a. a radial distortion lens having high axial demagnification decreasing toward the edges placed between the scanning device and the image source; and
   b. means to correct the scan signals to take into account the distorting effects of said lens, said means comprising:
      1. means to square each of the two scan signals;
      2. means to sum the two squared scan signals;
      3. means to multiply each of said two scan signals by a correction factor to obtain two corrected scan signals;
      4. means to square each of said two corrected scan signals;
      5. means to sum said two squared corrected scan signals;
      6. means to multiply said sum by the transfer function of said radial lens; and
      7. means to sum the said multiplied sum, the sum of said squared scan signals and one to obtain said correction factor.

2. The invention according to claim 1 wherein said image source is a transparency and said scanning device is a flying spot scanner.

3. The invention according to claim 1 wherein said summing means are operational amplifiers and said multiplying and squaring means are high speed analog multipliers.

* * * * *